US010809888B2

(12) United States Patent
Sun et al.

(10) Patent No.: US 10,809,888 B2
(45) Date of Patent: *Oct. 20, 2020

(54) SYSTEMS AND METHODS FOR PROVIDING A TAGGING INTERFACE FOR EXTERNAL CONTENT

(71) Applicant: Palantir Technologies Inc., Palo Alto, CA (US)

(72) Inventors: Zennard Sun, Mountain View, CA (US); Sophia Westwood, Mountain View, CA (US); Greg Martin, Oakland, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 15/867,185

(22) Filed: Jan. 10, 2018

(65) Prior Publication Data

US 2018/0129389 A1 May 10, 2018

Related U.S. Application Data

(63) Continuation of application No. 14/025,653, filed on Sep. 12, 2013, now Pat. No. 9,898,167.

(Continued)

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 16/907* (2019.01); *G06F 16/9558* (2019.01)

(58) Field of Classification Search
CPC .... G06F 16/958; G06F 3/0482; G06F 16/907; G06F 16/9558
See application file for complete search history.

(56) References Cited

U.S. PATENT DOCUMENTS 5,418,950 A 5/1995 Li et al.
5,428,737 A 6/1995 Li et al.
(Continued)

FOREIGN PATENT DOCUMENTS

CA 2666364 1/2015
DE 102014103482 9/2014
(Continued)

OTHER PUBLICATIONS

Strobelt et al., Document Cards: A Top Trumps Visualization for Documents; IEEE; 2009; pp. 1145-1152.*
(Continued)

*Primary Examiner* — Linh K Pham
(74) *Attorney, Agent, or Firm* — Knobbe, Martens, Olson & Bear, LLP

(57) ABSTRACT

Computer-implemented systems and methods are disclosed for providing a graphical user interface for tagging external content. In accordance with some embodiments, a method is provided for tagging content external to a database system. The method comprises accessing the external content of an electronic device. The method may comprise enhancing the web browser by providing a tagging interface for tagging at least a portion of the external content. The method may further comprise receiving created tag associated with a tagged portion of the external document content, and exporting the external content and the received tag to the database system. The tagging interface can also provide an option to export the created tag to an internal database system.

16 Claims, 7 Drawing Sheets

Related U.S. Application Data

(60) Provisional application No. 61/801,556, filed on Mar. 15, 2013.

(51) Int. Cl.
*G06F 16/907* (2019.01)
*G06F 16/955* (2019.01)

(56) References Cited

U.S. PATENT DOCUMENTS

| | | |
|---|---|---|
| 5,428,776 A | 6/1995 | Rothfield |
| 5,542,089 A | 7/1996 | Lindsay et al. |
| 5,608,899 A | 3/1997 | Li et al. |
| 5,613,105 A | 3/1997 | Xbikowski et al. |
| 5,701,456 A | 12/1997 | Jacopi et al. |
| 5,724,575 A | 3/1998 | Hoover et al. |
| 5,794,228 A | 8/1998 | French et al. |
| 5,794,229 A | 8/1998 | French et al. |
| 5,857,329 A | 1/1999 | Bingham |
| 5,911,138 A | 6/1999 | Li et al. |
| 5,918,225 A | 6/1999 | White et al. |
| 6,208,985 B1 | 3/2001 | Krehel |
| 6,232,971 B1 | 5/2001 | Haynes |
| 6,236,994 B1 | 5/2001 | Swartz et al. |
| 6,256,649 B1 * | 7/2001 | Mackinlay ............. G06F 40/18 715/212 |
| 6,289,334 B1 | 9/2001 | Reiner et al. |
| 6,289,338 B1 | 9/2001 | Stoffel et al. |
| 6,311,181 B1 | 10/2001 | Lee et al. |
| 6,321,274 B1 | 11/2001 | Shakib et al. |
| 6,369,835 B1 | 4/2002 | Lin |
| 6,463,404 B1 | 10/2002 | Appleby |
| 6,523,172 B1 | 2/2003 | Martinez-Guerra et al. |
| 6,539,538 B1 | 3/2003 | Brewster et al. |
| 6,640,231 B1 | 10/2003 | Andersen et al. |
| 6,643,613 B2 | 11/2003 | McGee et al. |
| 6,745,382 B1 | 6/2004 | Zothner |
| 6,748,481 B1 | 6/2004 | Parry et al. |
| 6,851,108 B1 | 2/2005 | Syme et al. |
| 6,857,120 B1 | 2/2005 | Arnold et al. |
| 6,877,137 B1 | 4/2005 | Rivette et al. |
| 6,976,024 B1 | 12/2005 | Chavez et al. |
| 7,027,974 B1 | 4/2006 | Busch et al. |
| 7,028,223 B1 | 4/2006 | Kolawa et al. |
| 7,085,890 B2 | 8/2006 | Kashyap |
| 7,089,541 B2 | 8/2006 | Ungar |
| 7,155,728 B1 | 12/2006 | Prabhu et al. |
| 7,216,133 B2 | 5/2007 | Wu et al. |
| 7,237,192 B1 | 6/2007 | Stephenson et al. |
| 7,240,330 B2 | 7/2007 | Fairweather |
| 7,406,592 B1 | 7/2008 | Polyudov |
| 7,519,589 B2 | 4/2009 | Charnock et al. |
| 7,533,069 B2 | 5/2009 | Fairweather |
| 7,546,353 B2 | 6/2009 | Hesselink et al. |
| 7,610,290 B2 | 10/2009 | Kruy et al. |
| 7,617,232 B2 | 11/2009 | Gabbert et al. |
| 7,627,489 B2 | 12/2009 | Schaeffer et al. |
| 7,685,083 B2 | 3/2010 | Fairweather |
| 7,703,021 B1 | 4/2010 | Flam |
| 7,783,679 B2 | 8/2010 | Bley |
| 7,818,658 B2 | 10/2010 | Chen |
| 7,853,573 B2 | 12/2010 | Warner et al. |
| 7,877,421 B2 | 1/2011 | Berger et al. |
| 7,908,521 B2 | 3/2011 | Sridharan et al. |
| 7,962,495 B2 | 6/2011 | Jain et al. |
| 7,979,424 B2 | 7/2011 | Dettinger et al. |
| 8,073,857 B2 | 12/2011 | Sreekanth |
| 8,103,962 B2 | 1/2012 | Embley et al. |
| 8,117,022 B2 | 2/2012 | Linker |
| 8,132,149 B2 | 3/2012 | Shenfield et al. |
| 8,271,948 B2 | 9/2012 | Talozi et al. |
| 8,417,715 B1 | 4/2013 | Bruckhaus et al. |
| 8,429,194 B2 | 4/2013 | Aymeloglu et al. |
| 8,433,702 B1 | 4/2013 | Carrino et al. |
| 8,468,452 B2 * | 6/2013 | Zellweger ............. G06T 13/00 715/711 |
| 8,489,623 B2 | 7/2013 | Jain et al. |
| 8,489,641 B1 | 7/2013 | Seefeld et al. |
| 8,499,287 B2 | 7/2013 | Shafi et al. |
| 8,504,626 B2 | 8/2013 | Nairn et al. |
| 8,560,494 B1 | 10/2013 | Downing |
| 8,639,552 B1 | 1/2014 | Chen et al. |
| 8,689,182 B2 | 4/2014 | Leithead et al. |
| 8,799,867 B1 | 8/2014 | Peri-Glass et al. |
| 8,855,999 B1 | 10/2014 | Elliot |
| 8,903,717 B2 | 12/2014 | Elliot |
| 8,909,597 B2 | 12/2014 | Aymeloglu et al. |
| 8,924,429 B1 | 12/2014 | Fisher et al. |
| 8,930,897 B2 | 1/2015 | Nassar |
| 8,935,201 B1 | 1/2015 | Fisher et al. |
| 8,972,869 B1 | 3/2015 | Willis et al. |
| 9,009,827 B1 | 4/2015 | Albertson et al. |
| 9,015,179 B2 | 4/2015 | Xiaolu et al. |
| 9,031,981 B1 | 5/2015 | Potter et al. |
| 9,105,000 B1 | 8/2015 | White et al. |
| 9,201,920 B2 | 12/2015 | Jain et al. |
| 9,223,773 B2 | 12/2015 | Isaacson |
| 9,229,952 B1 | 1/2016 | Meacham et al. |
| 9,292,388 B2 | 3/2016 | Fisher et al. |
| 9,367,609 B1 | 6/2016 | Mianji |
| 9,740,369 B2 | 8/2017 | Sun et al. |
| 9,898,167 B2 | 2/2018 | Sun et al. |
| 2002/0184111 A1 | 12/2002 | Swanson |
| 2003/0004770 A1 | 1/2003 | Miller et al. |
| 2003/0023620 A1 | 1/2003 | Trotta |
| 2003/0105833 A1 | 6/2003 | Daniels |
| 2003/0172053 A1 | 9/2003 | Fairweather |
| 2003/0177112 A1 | 9/2003 | Gardner |
| 2004/0044992 A1 | 3/2004 | Muller et al. |
| 2004/0083466 A1 | 4/2004 | Dapp et al. |
| 2004/0088177 A1 | 5/2004 | Travis et al. |
| 2004/0098731 A1 | 5/2004 | Demsey et al. |
| 2004/0103088 A1 | 5/2004 | Cragun et al. |
| 2004/0126840 A1 | 7/2004 | Cheng et al. |
| 2004/0139212 A1 | 7/2004 | Mukherjee et al. |
| 2004/0153837 A1 | 8/2004 | Preston et al. |
| 2004/0193608 A1 | 9/2004 | Gollapudi et al. |
| 2004/0221223 A1 | 11/2004 | Yu et al. |
| 2004/0260702 A1 | 12/2004 | Cragun et al. |
| 2005/0004911 A1 | 1/2005 | Goldberg et al. |
| 2005/0021397 A1 | 1/2005 | Cui et al. |
| 2005/0028094 A1 | 2/2005 | Allyn |
| 2005/0039119 A1 | 2/2005 | Parks et al. |
| 2005/0091420 A1 | 4/2005 | Snover et al. |
| 2005/0120080 A1 | 6/2005 | Weinreb et al. |
| 2005/0125715 A1 | 6/2005 | Di Franco et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0026170 A1 | 2/2006 | Kreitler et al. |
| 2006/0070046 A1 | 3/2006 | Balakrishnan et al. |
| 2006/0074967 A1 | 4/2006 | Shaburov |
| 2006/0080616 A1 | 4/2006 | Vogel et al. |
| 2006/0080619 A1 | 4/2006 | Carlson et al. |
| 2006/0116991 A1 | 6/2006 | Calderwood |
| 2006/0129746 A1 | 6/2006 | Porter |
| 2006/0129992 A1 | 6/2006 | Oberholtzer et al. |
| 2006/0142949 A1 | 6/2006 | Helt |
| 2006/0209085 A1 | 9/2006 | Wong et al. |
| 2006/0271838 A1 | 11/2006 | Carro |
| 2006/0271884 A1 | 11/2006 | Hurst |
| 2006/0288046 A1 | 12/2006 | Gupta et al. |
| 2007/0005582 A1 | 1/2007 | Navratil et al. |
| 2007/0027851 A1 | 2/2007 | Kruy et al. |
| 2007/0074169 A1 | 3/2007 | Chess et al. |
| 2007/0078872 A1 | 4/2007 | Cohen |
| 2007/0094248 A1 | 4/2007 | McVeigh et al. |
| 2007/0112714 A1 | 5/2007 | Fairweather |
| 2007/0113164 A1 | 5/2007 | Hansen et al. |
| 2007/0150805 A1 | 6/2007 | Misovski |
| 2007/0168336 A1 | 7/2007 | Ransil et al. |
| 2007/0178501 A1 | 8/2007 | Rabinowitz et al. |

(56) References Cited

U.S. PATENT DOCUMENTS

| | | | |
|---|---|---|---|
| 2007/0192281 A1 | 8/2007 | Cradick et al. | |
| 2007/0233709 A1 | 10/2007 | Abnous | |
| 2007/0260582 A1 | 11/2007 | Liang | |
| 2007/0266336 A1 | 11/2007 | Nojima et al. | |
| 2007/0271498 A1* | 11/2007 | Schachter | G06F 16/9562 715/205 |
| 2008/0077597 A1 | 3/2008 | Butler | |
| 2008/0077642 A1 | 3/2008 | Carbone et al. | |
| 2008/0082486 A1 | 4/2008 | Lermant et al. | |
| 2008/0126344 A1 | 5/2008 | Hoffman et al. | |
| 2008/0126951 A1 | 5/2008 | Sood et al. | |
| 2008/0140387 A1 | 6/2008 | Linker | |
| 2008/0148398 A1 | 6/2008 | Mezack et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0201320 A1* | 8/2008 | Hong | G06F 16/951 |
| 2008/0215543 A1 | 9/2008 | Huang et al. | |
| 2008/0228467 A1 | 9/2008 | Womack et al. | |
| 2008/0267386 A1 | 10/2008 | Cooper | |
| 2008/0281580 A1 | 11/2008 | Zabokritski | |
| 2008/0281805 A1 | 11/2008 | Xiaolu et al. | |
| 2009/0006150 A1 | 1/2009 | Prigge et al. | |
| 2009/0007056 A1 | 1/2009 | Prigge et al. | |
| 2009/0043762 A1 | 2/2009 | Shiverick et al. | |
| 2009/0055487 A1 | 2/2009 | Moraes et al. | |
| 2009/0077124 A1* | 3/2009 | Spivack | G06Q 30/02 |
| 2009/0083275 A1 | 3/2009 | Jacob et al. | |
| 2009/0083278 A1 | 3/2009 | Zhao et al. | |
| 2009/0094217 A1 | 4/2009 | Dettinger et al. | |
| 2009/0132953 A1 | 5/2009 | Reed et al. | |
| 2009/0144747 A1 | 6/2009 | Baker | |
| 2009/0161147 A1 | 6/2009 | Klave | |
| 2009/0164267 A1 | 6/2009 | Banatwala et al. | |
| 2009/0172674 A1 | 7/2009 | Bobak et al. | |
| 2009/0172821 A1 | 7/2009 | Daira et al. | |
| 2009/0177962 A1 | 7/2009 | Gusmorino et al. | |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0216867 A1 | 8/2009 | Pusateri et al. | |
| 2009/0217149 A1 | 8/2009 | Kamien et al. | |
| 2009/0222759 A1 | 9/2009 | Drieschner | |
| 2009/0228507 A1 | 9/2009 | Jain et al. | |
| 2009/0248721 A1 | 10/2009 | Burton et al. | |
| 2009/0254970 A1 | 10/2009 | Agarwal et al. | |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0070464 A1 | 3/2010 | Aymeloglu et al. | |
| 2010/0070897 A1 | 3/2010 | Aymeloglu et al. | |
| 2010/0073315 A1 | 3/2010 | Lee et al. | |
| 2010/0082671 A1 | 4/2010 | Li et al. | |
| 2010/0145902 A1 | 6/2010 | Boyan et al. | |
| 2010/0161646 A1 | 6/2010 | Ceballos et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2010/0204983 A1 | 8/2010 | Chung et al. | |
| 2010/0281351 A1 | 11/2010 | Mohammed | |
| 2010/0293174 A1 | 11/2010 | Bennett et al. | |
| 2010/0306285 A1 | 12/2010 | Shah et al. | |
| 2010/0313119 A1 | 12/2010 | Baldwin et al. | |
| 2011/0035396 A1 | 2/2011 | Merz et al. | |
| 2011/0041084 A1 | 2/2011 | Karam | |
| 2011/0066497 A1 | 3/2011 | Gopinath et al. | |
| 2011/0074811 A1 | 3/2011 | Hanson et al. | |
| 2011/0093490 A1 | 4/2011 | Schindlauer et al. | |
| 2011/0131547 A1 | 6/2011 | Elaasar | |
| 2011/0145401 A1 | 6/2011 | Westlake | |
| 2011/0191428 A1 | 8/2011 | Nairn et al. | |
| 2011/0208724 A1 | 8/2011 | Jones et al. | |
| 2011/0208822 A1 | 8/2011 | Rathod | |
| 2011/0238495 A1 | 9/2011 | Kang | |
| 2011/0252282 A1 | 10/2011 | Meek et al. | |
| 2011/0258216 A1 | 10/2011 | Supakkul et al. | |
| 2011/0270871 A1 | 11/2011 | He et al. | |
| 2011/0288660 A1 | 11/2011 | Wojsznis et al. | |
| 2011/0301938 A1 | 12/2011 | Agrawal et al. | |
| 2011/0321008 A1 | 12/2011 | Jhoney et al. | |
| 2012/0078595 A1 | 3/2012 | Balandin et al. | |
| 2012/0102022 A1 | 4/2012 | Miranker et al. | |
| 2012/0137235 A1 | 5/2012 | Ts et al. | |
| 2012/0159449 A1 | 6/2012 | Arnold et al. | |
| 2012/0173338 A1* | 7/2012 | Ariel | G06F 16/355 705/14.53 |
| 2012/0173381 A1 | 7/2012 | Smith | |
| 2012/0174057 A1 | 7/2012 | Narendra et al. | |
| 2012/0188252 A1 | 7/2012 | Law | |
| 2012/0191446 A1 | 7/2012 | Binsztok et al. | |
| 2012/0221553 A1 | 8/2012 | Wittmer et al. | |
| 2012/0239661 A1* | 9/2012 | Giblin | H04L 65/403 707/741 |
| 2012/0284719 A1 | 11/2012 | Phan et al. | |
| 2012/0304150 A1 | 11/2012 | Leithead et al. | |
| 2013/0024268 A1 | 1/2013 | Manickavelu | |
| 2013/0024731 A1 | 1/2013 | Shochat et al. | |
| 2013/0054551 A1 | 2/2013 | Lange | |
| 2013/0086482 A1 | 4/2013 | Parsons | |
| 2013/0091084 A1 | 4/2013 | Lee | |
| 2013/0096968 A1 | 4/2013 | Van Pelt et al. | |
| 2013/0124193 A1 | 5/2013 | Holmberg | |
| 2013/0198624 A1 | 8/2013 | Aymeloglu et al. | |
| 2013/0201161 A1 | 8/2013 | Dolan et al. | |
| 2013/0225212 A1 | 8/2013 | Khan | |
| 2013/0226944 A1 | 8/2013 | Baid et al. | |
| 2013/0232149 A1 | 9/2013 | Smith et al. | |
| 2013/0232220 A1 | 9/2013 | Sampson | |
| 2013/0251233 A1 | 9/2013 | Yang et al. | |
| 2013/0275446 A1 | 10/2013 | Jain et al. | |
| 2014/0012886 A1 | 1/2014 | Downing et al. | |
| 2014/0047319 A1 | 2/2014 | Eberlein | |
| 2014/0074855 A1 | 3/2014 | Zhao et al. | |
| 2014/0074888 A1 | 3/2014 | Potter et al. | |
| 2014/0108074 A1 | 4/2014 | Miller et al. | |
| 2014/0108958 A1 | 4/2014 | Toepper et al. | |
| 2014/0115589 A1 | 4/2014 | Marinelli, III et al. | |
| 2014/0115610 A1 | 4/2014 | Marinelli, III et al. | |
| 2014/0214579 A1 | 7/2014 | Shen et al. | |
| 2014/0244388 A1 | 8/2014 | Manouchehri et al. | |
| 2015/0046481 A1 | 2/2015 | Elliot | |
| 2015/0074110 A1* | 3/2015 | Paek | G06Q 50/10 707/737 |
| 2015/0100559 A1 | 4/2015 | Nassar | |
| 2015/0112641 A1 | 4/2015 | Faraj | |
| 2015/0142766 A1 | 5/2015 | Jain et al. | |
| 2015/0261847 A1 | 9/2015 | Ducott et al. | |
| 2015/0269030 A1 | 9/2015 | Fisher et al. | |
| 2016/0026923 A1 | 1/2016 | Erenrich et al. | |

FOREIGN PATENT DOCUMENTS

| | | |
|---|---|---|
| DE | 102014204840 | 9/2014 |
| DE | 102014215621 | 2/2015 |
| EP | 1647908 | 4/2006 |
| EP | 2221725 | 8/2010 |
| EP | 2284769 | 2/2011 |
| EP | 2634745 | 9/2013 |
| EP | 2743839 | 6/2014 |
| EP | 2778913 | 9/2014 |
| EP | 2778914 | 9/2014 |
| EP | 2778977 | 9/2014 |
| EP | 2778986 | 9/2014 |
| EP | 2911078 | 8/2015 |
| EP | 2921975 | 9/2015 |
| GB | 2366498 | 3/2002 |
| GB | 2513007 | 10/2014 |
| GB | 2508503 | 1/2015 |
| GB | 2508293 | 4/2015 |
| GB | 2518745 | 4/2015 |
| HK | 1194178 | 9/2015 |
| NL | 2013306 | 2/2015 |
| NZ | 622485 | 3/2015 |
| NZ | 616212 | 5/2015 |

(56) References Cited

FOREIGN PATENT DOCUMENTS

| | | |
|---|---|---|
| NZ | 616299 | 7/2015 |
| WO | WO 2000/034895 | 6/2000 |
| WO | WO 2002/035376 | 5/2002 |
| WO | WO 2003/060751 | 7/2003 |
| WO | WO 2008/064207 | 5/2008 |
| WO | WO 2010/030913 | 3/2010 |
| WO | WO 2010/030917 | 3/2010 |
| WO | WO 2011/071833 | 6/2011 |
| WO | WO 2013/030595 | 3/2013 |

OTHER PUBLICATIONS

Pea et al., Video Collaboratories for Research and Education: An Analysis of Collaboration Design Patterns; IEEE; 2008; pp. 205-247.*
Official Communication for EP Patent Application No. 14159629.6 dated Oct. 19, 2018.
"A Quick Guide to UniProtKB Swiss-Prot & TrEMBL," Sep. 2011, pp. 2.
"A Tour of Pinboard," <http://pinboard.in/tour> as printed May 15, 2014 in 6 pages.
"The FASTA Program Package," fasta-36.3.4, Mar. 25, 2011, pp. 29.
Alur et al., "Chapter 2: IBM InfoSphere DataStage Stages," IBM InfoSphere DataStage Data Flow and Job Design, Jul. 1, 2008, pp. 35-137.
Anonymous, "BackTult—JD Edwards One World Version Control System," printed Jul. 23, 2007 in 1 page.
Anonymous, "Frequently Asked Questions about Office Binder 97," http://web.archive.org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276_286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle et al., "Reducing Cross-Domain Call Overhead Using Batched Futures," SIGPLAN No. 29, 10 (Oct. 1994) pp. 341-354.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Johnson, Maggie "Introduction to YACC and Bison", Handout 13, Jul. 8, 2005, in 11 pages.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51-55.
Kitts, Paul, "Chapter 14: Genome Assembly and Annotation Process," The NCBI Handbook, Oct. 2002, pp. 1-21.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7—Dynamic Ontoloty Management System (Design)," Information Societies Technology Programme, Jan. 10, 2002, pp. 1-27.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Miklau et al., "Securing History: Privacy and Accountability in Database Systems," 3rd Biennial Conference on Innovative Data Systems Research (CIDR), Jan. 7-10, 2007, Asilomar, California, pp. 387-396.
Mizrachi, Ilene, "Chapter 1: GenBank: The Nuckeotide Sequence Database," The NCBI Handbook, Oct. 2002, pp. 1-14.
Morrison et al., "Converting Users to Testers: An Alternative Approach to Load Test Script Creation, Parameterization and Data Corellation," CCSC: Southeastern Conference, JCSC 28, 2, Dec. 2012, pp. 188-196.
Niepert et al., "A Dynamic Ontology for a Dynamic Reference Work", Joint Conference on Digital Libraries, Jun. 17-22, 2007, Vancouver, British Columbia, Canada, pp. 1-10.
Nivas, Tuli, "Test Harness and Script Design Principles for Automated Testing of non-GUI or Web Based Applications," Performance Lab, Jun. 2011, pp. 30-37.
Palantir, "Extracting and Transforming Data with Kite," Palantir Technologies, Inc., Copyright 2010, pp. 38.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "Kite," https://docs.palantir.com/gotham/3.11.1.0/adminreference/datasources.11 printed Aug. 30, 2013 in 2 pages.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema printed Aug. 30, 2013 in 1 page.
Palermo, Christopher J., "Memorandum," [Disclosure relating to U.S. Appl. No. 13/916,447, filed Jun. 12, 2013, and related applications], Jan. 31, 2014 in 3 pages.

(56) References Cited

OTHER PUBLICATIONS

Russell et al., "NITELIGHT: A Graphical Tool for Semantic Query Construction," 2008, pp. 10.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

Smart et al., "A Visual Approach to Semantic Query Design Using a Web-Based Graphical Query Designer," 16th International Conference on Knowledge Engineering and Knowledge Management (EKAW 2008),ÊAcitrezza, Catania, Italy, Sep. 29-Oct. 3, 2008, pp. 16.

Stamos et al., "Remote Evaluation," Journal ACM Transactions on Programming Languages and Systems (TOPLAS) vol. 12, Issue 4, Oct. 1990, pp. 537-564.

Symantec Corporation, "E-Security Begins with Sound Security Policies," Announcement Symantec, Jun. 14, 2001.

Wikipedia, "Machine Code", p. 1-5, printed Aug. 11, 2014.

Wollrath et al., "A Distributed Object Model for the Java System," Proceedings of the 2nd Conference on USENEX, Conference on Object-Oriented Technologies (COOTS), Jun. 17, 1996, pp. 219-231.

Notice of Acceptance for New Zealand Patent Application No. 616212 dated Jan. 23, 2015.

Notice of Acceptance for New Zealand Patent Application No. 616299 dated Apr. 7, 2015.

Notice of Allowance for U.S. Appl. No. 13/657,635 dated Jan. 29, 2016.

Notice of Allowance for U.S. Appl. No. 13/767,779 dated Mar. 17, 2015.

Notice of Allowance for U.S. Appl. No. 14/019,534 dated Feb. 4, 2016.

Notice of Allowance for U.S. Appl. No. 14/044,800 dated Sep. 2, 2014.

Notice of Allowance for U.S. Appl. No. 14/148,568 dated Aug. 26, 2015.

Notice of Allowance for U.S. Appl. No. 14/254,757 dated Sep. 10, 2014.

Notice of Allowance for U.S. Appl. No. 14/254,773 dated Aug. 20, 2014.

Notice of Allowance for U.S. Appl. No. 14/304,741 dated Apr. 7, 2015.

Notice of Allowance for U.S. Appl. No. 14/508,696 dated Jul. 27, 2015.

Notice of Allowance for U.S. Appl. No. 14/533,433 dated Sep. 1, 2015.

Notice of Allowance for U.S. Appl. No. 14/581,902 dated Nov. 13, 2015.

Official Communication for Australian Patent Application No. 2013237658 dated Feb. 2, 2015.

Official Communication for Australian Patent Application No. 2013237710 dated Jan. 16, 2015.

Official Communication for Australian Patent Application No. 2014201506 dated Feb. 27, 2015.

Official Communication for Australian Patent Application No. 2014201507 dated Feb. 27, 2015.

Official Communication for Australian Patent Application No. 2014201580 dated Feb. 27, 2015.

Official Communication for Canadian Patent Application No. 2666364 dated Jun. 4, 2012.

Official Communication for Canadian Patent Application No. 2807899 dated Jul. 20, 2015.

Official Communication for Canadian Patent Application No. 2807899 dated Oct. 24, 2014.

Official Communication for Canadian Patent Application No. 2828264 dated Apr. 28, 2015.

Official Communication for Canadian Patent Application No. 2829266 dated Apr. 28, 2015.

Official Communication for European Patent Application No. 13157474.1 dated Oct. 30, 2015.

Official Communication for European Patent Application No. 14158958.0 dated Mar. 11, 2016.

Official Communication for European Patent Application No. 14158958.0 dated Apr. 16, 2015.

Official Communication for European Patent Application No. 14158958.0 dated Jun. 3, 2014.

Official Communication for European Patent Application No. 14158977.0 dated Jun. 10, 2014.

Official Communication for European Patent Application No. 14158977.0 dated Mar. 11, 2016.

Official Communication for European Patent Application No. 14158977.0 dated Apr. 16, 2015.

Official Communication for European Patent Application No. 14159175.0 dated Jul. 17, 2014.

Official Communication for European Patent Application No. 14159175.0 dated Feb. 4, 2016.

Official Communication for European Patent Application No. 14159464.8 dated Feb. 18, 2016.

Official Communication for European Patent Application No. 14159464.8 dated Jul. 31, 2014.

Official Communication for European Patent Application No. 14159629.6 dated Sep. 22, 2014.

Official Communication for European Patent Application No. 14159629.6 dated Jul. 31, 2014.

Official Communication for European Patent Application No. 15155845.9 dated Oct. 6, 2015.

Official Communication for European Patent Application No. 15159520.4 dated Jul. 15, 2015.

Official Communication for German Patent Application No. 10 2013 221 052.3 dated Mar. 24, 2015.

Official Communication for German Patent Application No. 10 2013 221 057.4 dated Mar. 23, 2015.

Official Communication for Great Britain Patent Application No. 1404479.6 dated Aug. 12, 2014.

Official Communication for Great Britain Patent Application No. 1404479.6 dated Jul. 9, 2015.

Official Communication for Great Britain Patent Application No. 1404574.4 dated Dec. 18, 2014.

Official Communication for Great Britain Patent Application No. 1413935.6 dated Dec. 21, 2015.

Official Communication for Great Britain Patent Application No. 1413935.6 dated Jan. 27, 2015.

Official Communication for Israel Patent Application No. 198253 dated Jan. 12, 2016.

Official Communication for Israel Patent Application No. 198253 dated Nov. 24, 2014.

Official Communication for Netherlands Patent Application No. 2011613 dated Aug. 13, 2015.

Official Communication for Netherlands Patent Application No. 2011627 dated Aug. 14, 2015.

Official Communication for Netherlands Patent Application No. 2012434 dated Jan. 8, 2016.

Official Communication for Netherlands Patent Application No. 2012437 dated Sep. 18, 2015.

Official Communication for Netherlands Patent Application No. 2013306 dated Apr. 24, 2015.

Official Communication for New Zealand Patent Application No. 616299 dated Jan. 26, 2015.

Official Communication for New Zealand Patent Application No. 622389 dated Mar. 20, 2014.

Official Communication for New Zealand Patent Application No. 622404 dated Mar. 20, 2014.

Official Communication for New Zealand Patent Application No. 622414 dated Mar. 24, 2014.

Official Communication for New Zealand Patent Application No. 622484 dated Apr. 2, 2014.

Official Communication for New Zealand Patent Application No. 622485 dated Nov. 21, 2014.

Official Communication for New Zealand Patent Application No. 622497 dated Jun. 19, 2014.

(56) References Cited

OTHER PUBLICATIONS

Official Communication for New Zealand Patent Application No. 622497 dated Mar. 26, 2014.
Official Communication for New Zealand Patent Application No. 622513 dated Apr. 3, 2014.
Official Communication for U.S. Appl. No. 13/411,291 dated Oct. 1, 2015.
Official Communication for U.S. Appl. No. 13/411,291 dated Jul. 15, 2015.
Official Communication for U.S. Appl. No. 13/608,864 dated Mar. 17, 2015.
Official Communication for U.S. Appl. No. 13/608,864 dated Jun. 8, 2015.
Official Communication for U.S. Appl. No. 13/657,635 dated Mar. 30, 2015.
Official Communication for U.S. Appl. No. 13/657,635 dated Oct. 7, 2015.
Official Communication for U.S. Appl. No. 13/657,656 dated May 6, 2015.
Official Communication for U.S. Appl. No. 13/657,656 dated Oct. 7, 2014.
Official Communication for U.S. Appl. No. 13/827,627 dated Mar. 2, 2015.
Official Communication for U.S. Appl. No. 13/827,627 dated Oct. 20, 2015.
Official Communication for U.S. Appl. No. 13/827,627 dated Dec. 22, 2015.
Official Communication for U.S. Appl. No. 13/827,627 dated Aug. 26, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 14/019,534 dated Jul. 20, 2015.
Official Communication for U.S. Appl. No. 14/019,534 dated Sep. 4, 2015.
Official Communication for U.S. Appl. No. 14/025,653 dated Mar. 3, 2016.
Official Communication for U.S. Appl. No. 14/025,653 dated Oct. 6, 2015.
Official Communication for U.S. Appl. No. 14/134,558 dated Oct. 7, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/304,741 dated Mar. 3, 2015.
Official Communication for U.S. Appl. No. 14/304,741 dated Aug. 6, 2014.
Official Communication for U.S. Appl. No. 14/508,696 dated Mar. 2, 2015.
Official Communication for U.S. Appl. No. 14/526,066 dated Jan. 21, 2016.
Official Communication for U.S. Appl. No. 14/631,633 dated Feb. 3, 2016.
Official Communication for U.S. Appl. No. 14/877,229 dated Mar. 22, 2016.
"A First Look: Predicting Market Demand for Food Retail using a Huff Analysis," TRF Policy Solutions, Jul. 2012, pp. 30.
Acklen, Laura, "Absolute Beginner's Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Barbagallo et al., "Semi-automated Methods for the Annotation and Design of a Semantic Network Designed for Sentiment Analysis of Social Web Content," IEEE, (c) 2011.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Cesarano et al., "Improving Usability of Web Pages for Blinds," 2007, IEEE, 8 pages.
Charles, Robert, "KARIS1: A Multiple-scheme Framework for Encryption Based on an Annotation Model for Enhanced Information Security," 2008, IEEE, 2 pages.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Griffith, Daniel A., "A Generalized Huff Model," Geographical Analysis, Apr. 1982, vol. 14, No. 2, pp. 135-144.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Palantir, https://docs.palantir.com/gotham/3.11.1.0/dataguide/baggage/KiteSchema.xsd printed Apr. 4, 2014 in 4 pages.
Yang et al., "An Automated Semantic Annotation based-on Wordnet Ontology," added to IEEE Wplorer Sep. 16, 2010, IEEE, 6 pages.
Notice of Acceptance for New Zealand Patent Application No. 622485 dated Nov. 24, 2014.
Notice of Allowance for U.S. Appl. No. 13/657,656 dated May 10, 2016.
Notice of Allowance for U.S. Appl. No. 14/025,653 dated Oct. 13, 2017.
Notice of Allowance for U.S. Appl. No. 14/134,558 dated Apr. 20, 2017.
Official Communication for European Patent Application No. 17155145.0 dated Aug. 31, 2017.
Official Communication for U.S. Appl. No. 14/025,653 dated Nov. 16, 2016.
Official Communication for U.S. Appl. No. 14/025,653 dated Aug. 18, 2016.
Official Communication for U.S. Appl. No. 14/025,653 dated Apr. 4, 2017.
Official Communication for U.S. Appl. No. 14/134,558 dated May 16, 2016.
Official Communication for U.S. Appl. No. 14/134,558 dated Aug. 26, 2016.

(56) References Cited

OTHER PUBLICATIONS

Official Communication for U.S. Appl. No. 14/134,558 dated Nov. 3, 2016.
U.S. Pat. No. 9,898,167, Systems and Methods for Providing a Tagging Interface for External Content, Feb. 20, 2018.
U.S. Pat. No. 9,740,369, Systems and Methods for Providing a Tagging Interface for External Content, Aug. 22, 2017.
Official Communication for European Patent Application No. 14159464.8 dated Nov. 26, 2018.
Official Communication for European Patent Application No. 14159629.6 dated Jun. 21, 2019.

* cited by examiner

SYSTEMS AND METHODS FOR PROVIDING A TAGGING INTERFACE FOR EXTERNAL CONTENT

INCORPORATION BY REFERENCE TO ANY PRIORITY APPLICATIONS

This application is a continuation of U.S. patent application Ser. No. 14/025,653, filed Sep. 12, 2013, which application claims benefit of U.S. Provisional Patent Application No. 61/801,556, filed Mar. 15, 2013. The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

BACKGROUND

Data is commonly stored in computer-based systems in fixed, rigidly structured data stores. For example, one common type of data store is a "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Often, the underlying structure of these types of data stores is poorly suited for data analysis. One approach for facilitating a more efficient analysis of data in such data stores is to reorganize that data according to an object model that defines object structures and relationships between the object structures. Tagging is a method used to create objects, properties, or links between objects and/or properties in structured or unstructured data. It can add structure to unstructured data or add further structure to structured data.

BRIEF DESCRIPTION OF THE DRAWINGS

Reference will now be made to the accompanying drawings showing example embodiments of the present application, and in which.

DETAILED DESCRIPTION OF EXEMPLARY EMBODIMENTS

Reference will now be made in detail to the embodiments, the examples of which are illustrated in the accompanying drawings. Whenever possible, the same reference numbers will be used throughout the drawings to refer to the same or like parts.

Figure 1:
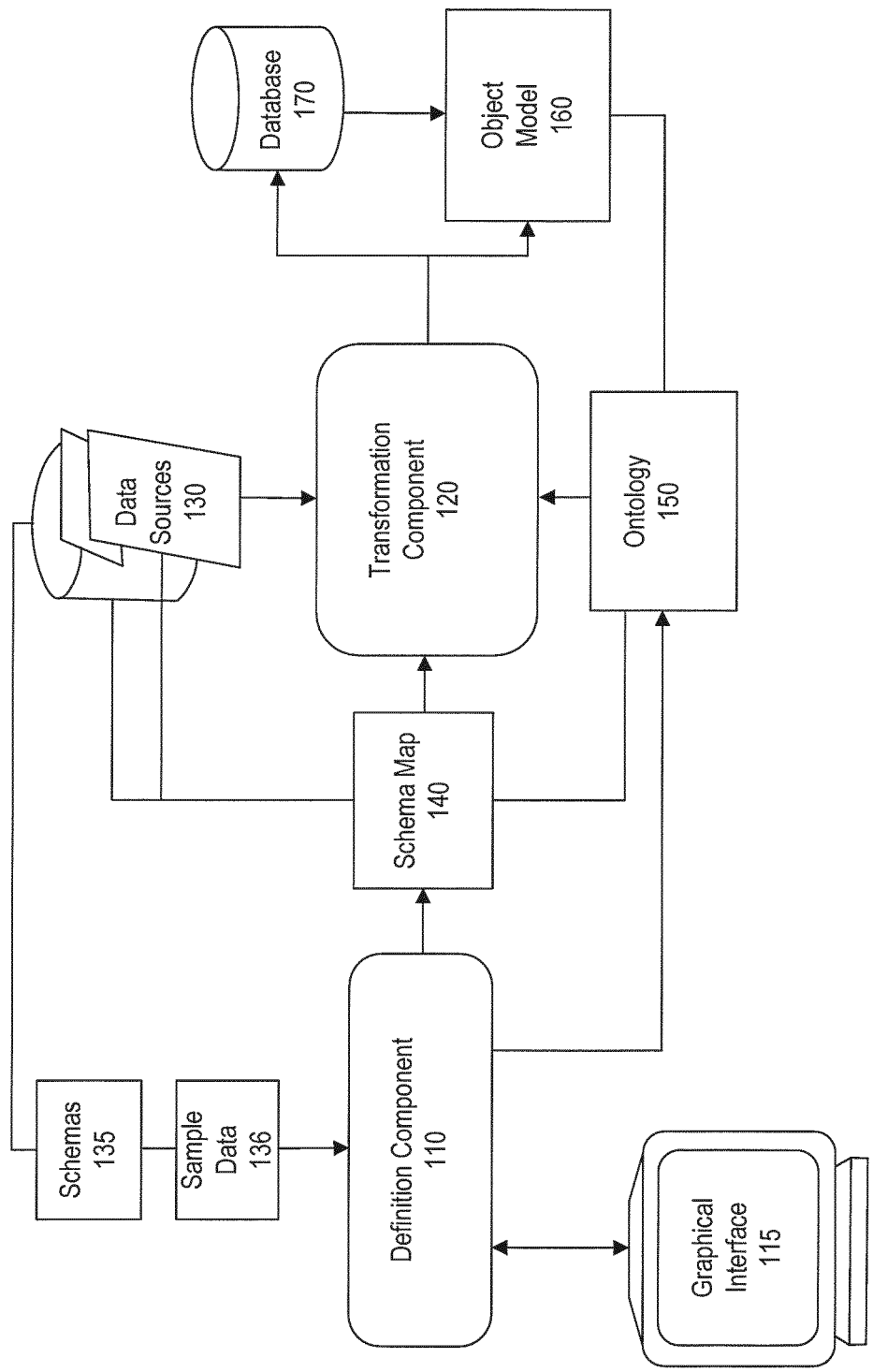
FIG. 1 is an block diagram depicting an exemplary internal database system, consistent with embodiments of the present disclosure.

FIG. 1 shows, in block diagram form, an exemplary data fusion system 100, consistent with embodiments of the present disclosure. Among other things, system 100 facilitates transformation of one or more data sources, such as data sources 130, into an object model 160, whose semantics are defined by an ontology 150. The transformation can be performed for a variety of reasons. For example, a database administrator can wish to import data from data sources 130 into a database 170 for persistently storing object model 160. As another example, a data presentation component (not depicted) can transform input data from data sources 130 "on the fly" into object model 160. Object model 160 can then be utilized, in conjunction with ontology 150, for analysis through graphs and/or other data visualization techniques.

System 100 comprises a definition component 110 and a translation component 120, both implemented by one or more processors on one or more computing devices executing hardware and/or software-based logic for providing various functionality described herein. As will be appreciated from the present disclosure, system 100 can comprise fewer or additional components that provide various functionalities described herein. Such components are, for clarity, omitted from FIG. 1. Moreover, the component(s) of system 100 responsible for providing various functionalities can further vary from embodiment to embodiment.

Definition component 110 generates and/or modifies ontology 150 and a schema map 140. Exemplary embodiments for defining an ontology (such as ontology 150) is described in U.S. Pat. No. 7,962,495 (the '495 patent), issued Jun. 14, 2011, the entire contents of which are expressly incorporated herein by reference for all purposes. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time. And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring back to FIG. 1, schema map 140 can define how various elements of schemas 135 for data sources 130 map to various elements of ontology 150. Definition component 110 receives, calculates, extracts, or otherwise identifies schemas 135 for data sources 130. Schemas 135 define the structure of data sources 130—for example, the names and other characteristics of tables, files, columns, fields, properties, and so forth. Definition component 110 furthermore optionally identifies sample data 136 from data sources 130. Definition component 110 can further identify object type, relationship, and property definitions from ontology 150, if any already exist. Definition component 110 can further identify pre-existing mappings from schema map 140, if such mappings exist.

Based on the identified information, definition component 110 can generate a graphical interface 115. Graphical interface 115 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 115 features a visual workspace that visually depicts representations of the elements of ontology 150 for which mappings are defined in schema map 140. Graphical interface 115 also includes controls for adding new elements to schema map 140 and/or ontology 150, including objects, properties of objects, and relationships, via the visual workspace. After elements of ontology 150 are represented in the visual workspace, graphical interface 115 can further provide controls in association with the representations that allow for modifying the elements of ontology 150 and identifying how the elements of ontology 150 correspond to elements of schemas 135. Optionally, the graphical interface 115 can further utilize the sample data 136 to provide the user with a preview of object model 160 as the user defines schema map 140. In response to the input via the various controls of graphical interface 115, definition component 110 can generate and/or modify ontology 150 and schema map 140.

In some embodiments, graphical user 115 can provide an interface providing a user with the ability to add structure to an unstructured document stored in data sources 130 by tagging one or more portions (e.g., text) within the document. Defining tags and applying these tags to a portion of the document can create object, properties, or links creating a relationship between one or more objects and/or properties. An exemplary interface, including related features and pop-up windows, is described below with reference to FIGS. 2A and 2B.

Figure 2A:
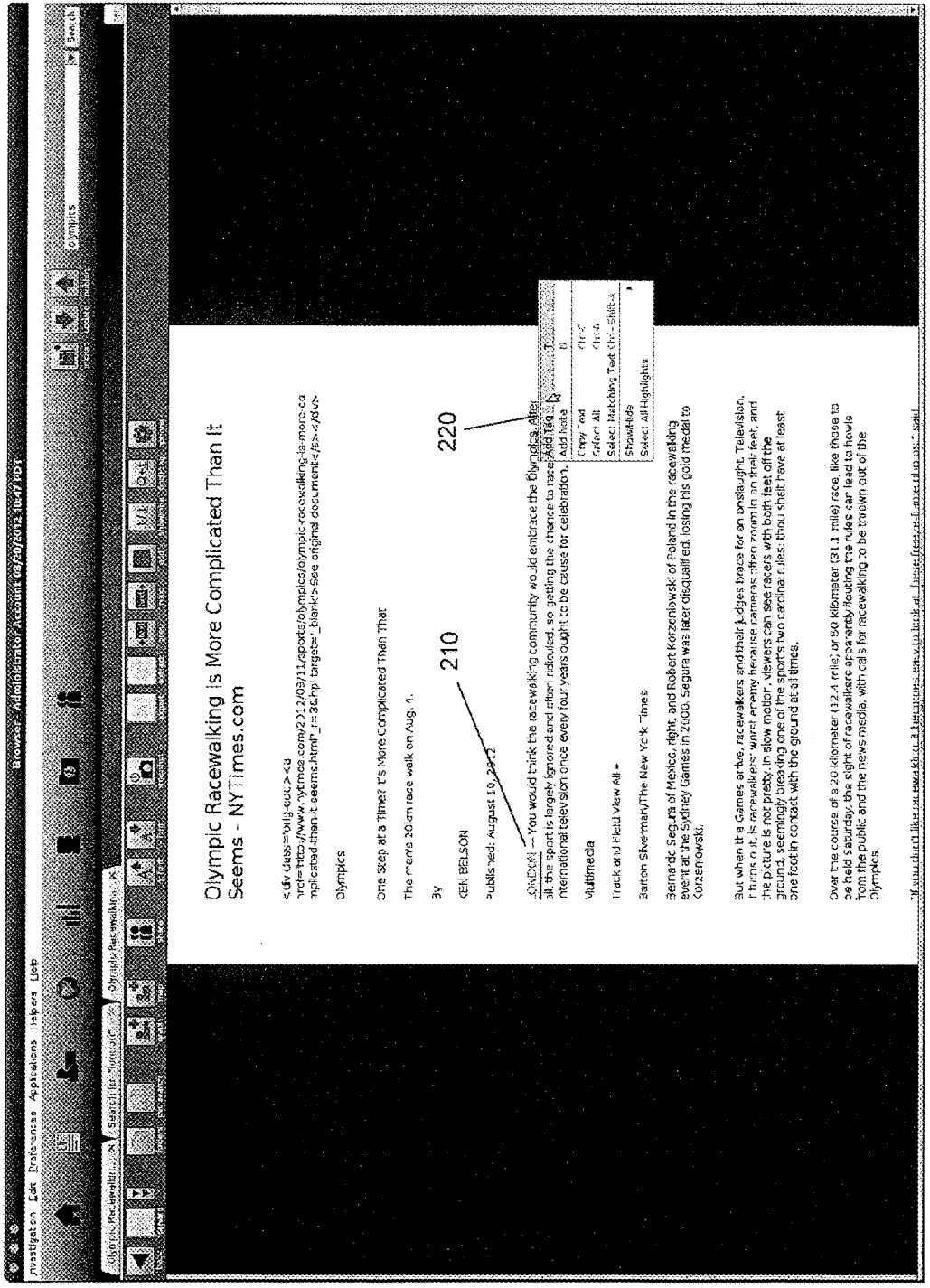
FIGS. 2A and 2B are screenshots depicting an exemplary interface for tagging an unstructured document stored in the database system of FIG. 1, consistent with embodiments of the present disclosure.

FIG. 2A is a screenshot depicting an exemplary interface 200 for tagging an unstructured document stored in the database system of FIG. 1. As shown in FIG. 2A, interface 200 can display a document that was unstructured before tag 210 had been applied. To tag text in the document, a user can for example select text (in this case, "Olympics") and right-click on a mouse for a pop-up 220 to appear and to provide the user with the ability to select an "Add Tag . . . " option.

Figure 2B:
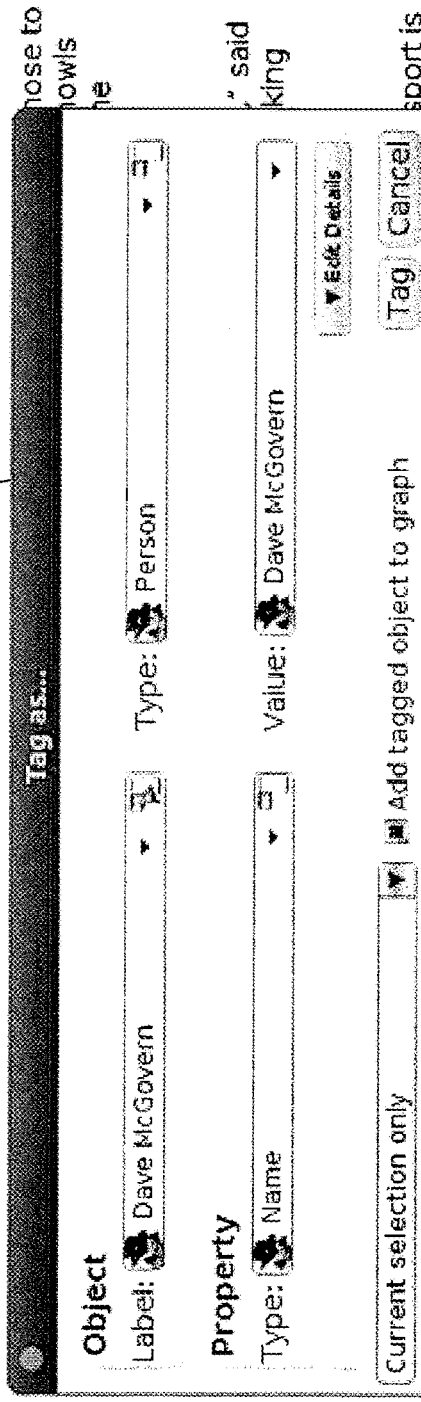

Selecting the "Add Tag . . . " option can result in, for example, a "Tag as . . . " pop-up window appearing, an example of which is shown in FIG. 2B. Pop-up window 230 provides the user with the ability to assign selected text (in this case, "Dave McGovern") to a person object and/or a name property.

Referring back to FIG. 1, transformation component 120 can be invoked after schema map 140 and ontology 150 have been defined or redefined. Transformation component 120 identifies schema map 140 and ontology 150. Transformation component 120 further reads data sources 130 and identifies schemas 135 for data sources 130. For each element of ontology 150 described in schema map 140, transformation component 120 iterates through some or all of the data items of data sources 130, generating elements of object model 160 in the manner specified by schema map 140. In some embodiments, transformation component 120 can store a representation of each generated element of object model 160 in a database 170. In some embodiments, transformation component 120 is further configured to synchronize changes in object model 160 back to data sources 130.

Data sources 130 can be one or more sources of data, including, without limitation, spreadsheet files, databases, email folders, document collections, media collections, contact directories, and so forth. Data sources 130 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 130 can include data structures stored persistently in non-volatile memory. Data sources 130 can also or instead include temporary data structures generated from underlying data sources via data extraction components, such as a result set returned from a database server executing an database query.

Schema map 140, ontology 150, and schemas 135 can be stored in any suitable data structures, such as XML files, database tables, and so forth. In some embodiments, ontology 150 is maintained persistently. Schema map 140 can or cannot be maintained persistently, depending on whether the transformation process is perpetual or a one-time event. Schemas 135 need not be maintained in persistent memory, but can be cached for optimization.

Object model 160 comprises collections of elements such as typed objects, properties, and relationships. The collections can be structured in any suitable manner. In some embodiments, a database 170 stores the elements of object model 160, or representations thereof. In some embodiments, the elements of object model 160 are stored within database 170 in a different underlying format, such as in a series of object, property, and relationship tables in a relational database.

Figure 3:
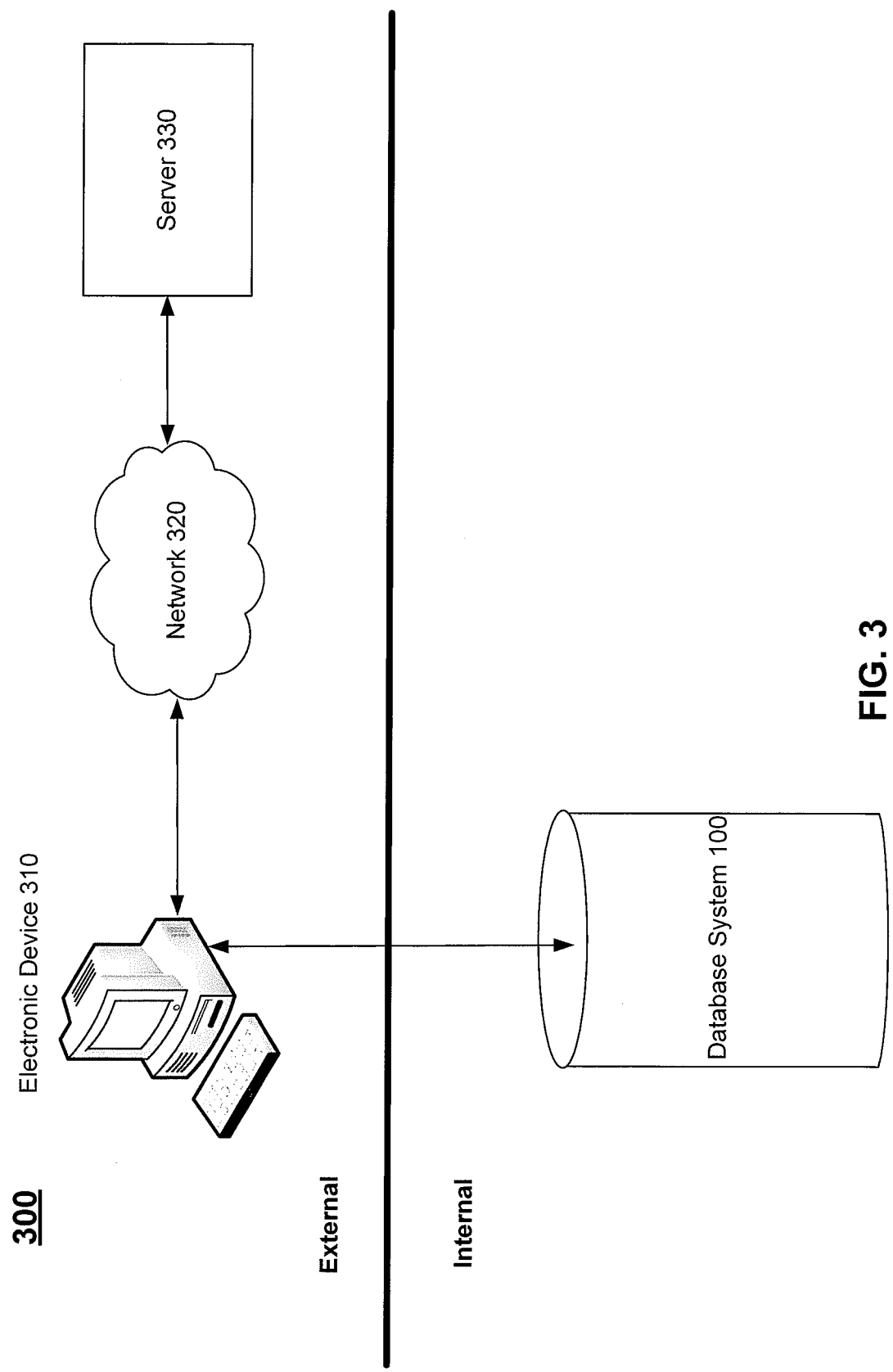
FIG. 3 is a block diagram depicting an exemplary system comprising the database system of FIG. 1 and one or more components external to the database system of FIG. 1, consistent with embodiments of the present disclosure.

FIG. 3 is a block diagram depicting an exemplary system 300 comprising database system of FIG. 1 and one or more components external to the database system of FIG. 1. System 300 comprises database system 100, which is referred to as an "internal system," and one or more components located external to database system 100. These external components can include, for example, electronic device 310, network 320, and server 330.

Electronic device 310 can provide the ability to communicate with server 330 via network 320. By way of example, electronic device 310 can be a personal computer, a tablet computer, a personal digital assistant (PDA), a mobile phone, a smart-phone, or any other web-enabled computing device with a processor and a memory. Electronic device 310 can provide support for software applications including, a web browser (or other network communication software), that can also comprise a special add-on, a plug-in, or a bookmarklet. In some embodiments, electronic device 310 and a portion of network 320 can be included in internal database system 100. For example, electronic device 310 could provide graphical interface 115 of internal database system 100.

Electronic device 310 can also include, for example, one or more processors (not shown), a memory device (not shown), and a data interface (not shown). The one or more processors can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the instructions can be implemented in hardware components or combinations of hardware and software such as, for example, Application Specific Integrated Circuits (ASICs), special purpose computers, or general purpose computers.

Server 330 can comprise hardware, software, or a combination of both that provides the capability for communicating with electronic device 310 via network 320. Server 330 provides content to electronic device 310. This content is stored external to database system and can be referred to as "external content." External content can include a web page, a document, a PDF file, a sound or audio file, an image or video file, a database, an email, a form, etc. In some embodiments, server 330 can be a part of a network cloud, which can include, for example, one or more networked servers.

Network 320 can be, for example, the Internet, an intranet, a local area network, a wide area network, a campus area network, a metropolitan area network, an extranet, a private extranet, any set of two or more coupled electronic devices, or a combination of any of these or other appropriate networks. In the exemplary embodiment of FIG. 3, network 320 is considered external to database system 100, but portions of network 320 (as stated above) can be located in internal database system 100.

Figure 4:
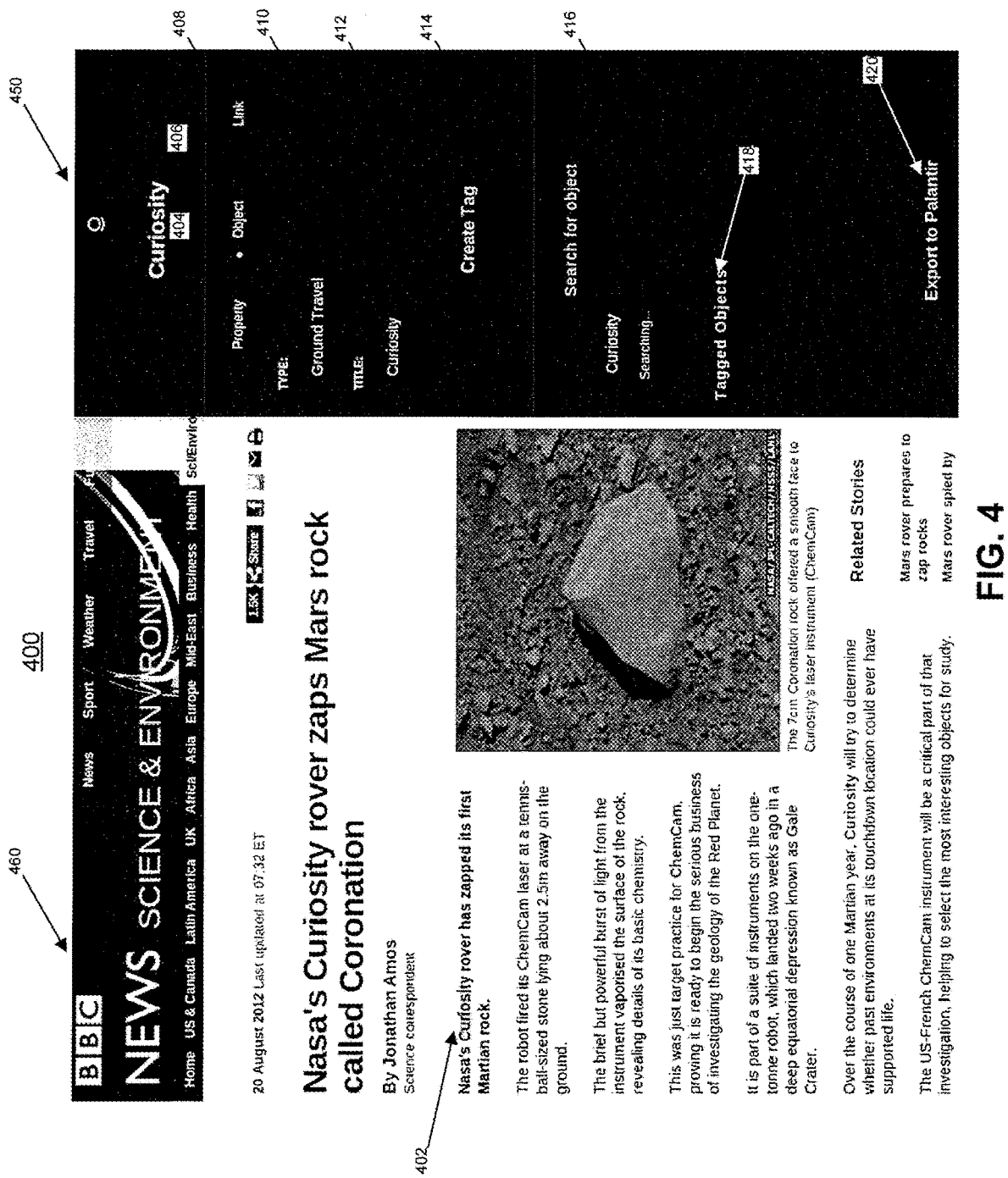
FIG. 4 is a screenshot depicting an exemplary tagging interface via a web browser displaying an external content, consistent with embodiments of the present disclosure.

FIG. 4 is a screenshot 400 depicting an exemplary tagging interface via a web browser that can display external content. For purposes of illustration, screenshot 400 depicts a news web page on a web site (e.g., BBC™ web site) displaying external content 460 on a web browser of an electronic device (e.g., electronic device 310). Screenshot 400 also depicts tagging interface 450. In some embodiments, tagging interface 450 can be displayed in response to a user installing and activating a bookmarklet in the web browser. In other embodiments, tagging interface 450 can be displayed in response to a user installing and activating a plug-in in the web browser. In some embodiments, a user may login to internal database system 100 before the bookmarklet or plugin is activated.

Tagging interface 450 can be used to create tags associated with at least a portion of external content 460. In some embodiments, the user can select at least a portion of external content 460. For example, if external content 460 is text-based, the user can select at least a portion of the text of external content 460. In other embodiments, if external content is an image or video, the user can select at least a portion of the image or at least a frame of the video to create one or more tags associated with the selected portions of external content 460. It can be understood that there can be other types of external content 460 that can also be selected for creating tags. For example, an audio file having a voice of a person can be tagged as a property of a person object.

When the user selects a portion of external content 460, at least some of the fields of tagging interface 450 (e.g., TITLE 412, TYPE 410, etc.) can be automatically populated. In some embodiments, this automatic population of fields can depend on the type of external content 460. For example, in a text-based document, TITLE 412 field can be automatically populated with the selected portion of the text. In the screenshot of FIG. 4, TITLE 412 can be automatically populated with the selected portion of text "Curiosity." In some embodiments, TYPE 410 field of tagging interface can also be automatically populated. In the screenshot of FIG. 4, TYPE 410 can be automatically populated with a type of the selected portion of text, "Ground Travel." In some other embodiments, the fields of tagging interface 450 can be filled manually by the user or can be selected from a pull-down list of options.

Tagging interface 450 includes options for designating the type of tag. These options include a property tag option 404, an object tag option 406, and a link tag option 408. It will be understood by a skilled person in the art that it is possible to customize tagging interface 450 to modify the various available options. For example, a selection of property tag option 404 could result in tagging interface 450 adding one or more fields for linking an object to the property. For example, the property "Curiosity" could be linked to an object "Robot." Moreover, a selection of link tag option 408 could result in tagging interface 450 adding one or more fields linking two or more objects or two or more properties.

After the tagging option is selected and the appropriate fields are filled in, a Create Tag button 414 can be selected to create a tag associated with the selected portion of external content 460. In some embodiments, the properties of created tag can be modified after the tag is created. For example, TYPE 410 field can be changed, if desired, from "Ground Travel" to "Air Travel" after the tag is created. In some embodiments, the created tag can be stored in a memory of the electronic device.

After an object tag is created, it can be displayed in a Tagged objects field 418 of tagging interface 450. Tagged objects field 418 can be useful as it can display all of the created object tags associated with external content 460 in one portion of tagging interface 450. Tagged objects field 418 can also be useful as it can enable a user to modify any of the created tags. Moreover, after property tag option 404 is selected, tagged objects field 418 of tagging interface 450 allows a user to select an appropriate tagged object from tagged objects field 418 for linking that property tag to a tagged object. Further, after a link tag option 408 is selected, tagged objects field 418 of tagging interface 450 could allow a user to select two or more appropriate tagged objects from the tagged objects field 418. Moreover, tagging interface 450 could provide a tagged properties field (not shown) that would provide a user with the option of linking two or more tagged properties.

Tagging interface 450 can also include, in some embodiments, a search for object field 416, which can be used to search for already existing created tag objects in internal database system (e.g., Database System 100). For example, FIG. 4 depicts "Search for object" 416, which is populated with the tag "Curiosity." If a created tag object is already associated with "Curiosity" in the internal database system, results associated with the existing created tag objects can be displayed in "Search for object" field 416. If such results indeed exist, tagging interface 450 alone or in combination with internal database system 100 can sync the tagged object from tagging interface 450 with the object existing in internal database system 100. In some embodiments, tagging interface 450, using "Search for object" field 416, allows the ability to create links between tagged objects and/or properties from external content with objects and/or properties in internal database system 100. In some embodiments, "Search for object" field 416 provides the ability to create object types and/or property types for entities that exist in internal database system 100. In some embodiments, a user of electronic device 310 is logged in to database system 100 in order to perform the syncing operation.

Created tags and external content 460 can be gathered for storage using, for example, an application program interface (API), such as a Java client API. The API can create one or more parameter-value pairs associated with the tag. For example, with reference to the exemplary embodiments of FIG. 4, the parameter-value pairs that are created could be TagOption:Object, Title:Curiosity, Type:Ground Travel, Content:<label for external content 460>, DateAdded:2012/08/20, User:John Doe, etc. Moreover, external content 460 can be stored in a cache or a directory associated with the tagging interface under a label for that external content 460. By way of example, external content 460 can be stored as external content (as depicted in FIG. 4), a representation of external content 460, alphanumeric characters of external content 460, and/or any audio/visual data of external content 460.

Created tags and external content 460 can be exported to an internal database system (e.g., Database System 100) by selecting an export button 420 (such as the "Export to Palantir" button in FIG. 4) of Tagging Interface 450. In some embodiments, electronic device 310 must be logged into internal database system 100 to export the content 460 and any created tags. In some embodiments, content and created tags can be stored in the external system (e.g., memory of electronic device 310 or a cache associated with a web browser), in internal database system 100, or any combination thereof. In embodiments where the content and created tags are stored in the external system, the content and created tags can be exported after electronic device 310 connects to internal database system 100. In some embodiments, the selection of create tag button 414 causes tagging interface 450 to automatically export the content and created one or more tags to internal database system 100. In some embodiments, electronic device 310 can include an interface for converting the stored parameter-value pairs and the stored content into data compatible with internal database system 100. Alternatively, or additionally, in some embodiments, internal database system 100 includes the interface.

After receiving external content and the created one or more tags, internal database system 100 stores the exported data into appropriate components. For example, external content 460 (or a converted format of external content 460) can be stored in data sources 130, while the parameter-value pairs that were created by electronic device 310 (or a converted format of the parameter value-pairs) can be stored in database 170 according to ontology 150 and object model 160.

Figure 5:
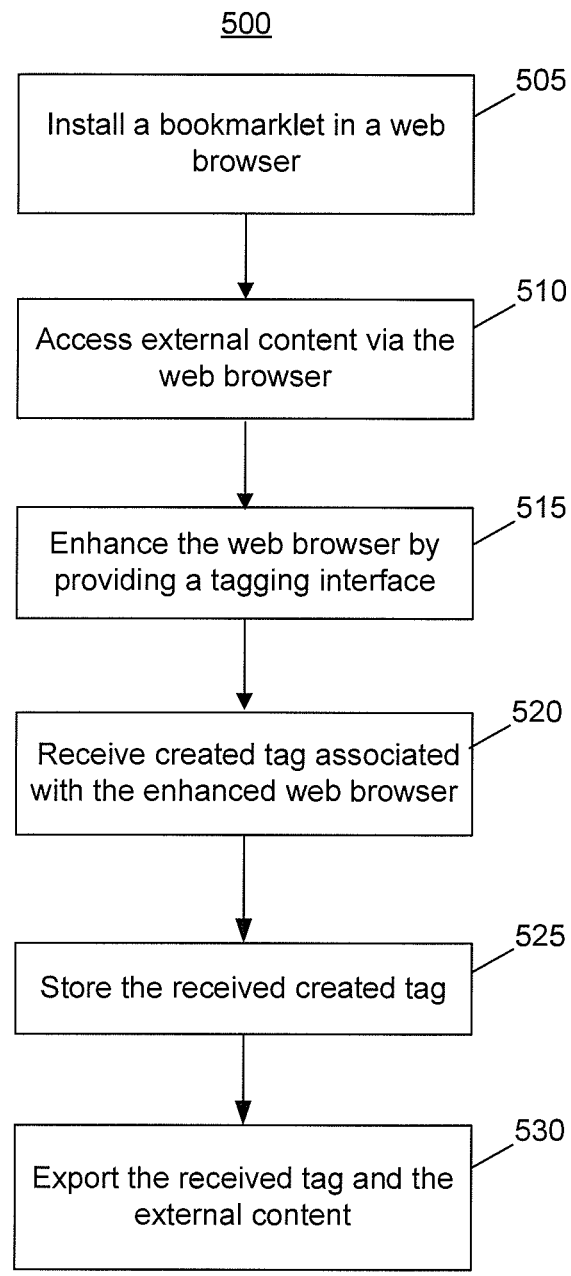
FIG. 5 is a flowchart representing an exemplary method for tagging external content, consistent with embodiments of the present disclosure.

FIG. 5 is a flowchart representing an exemplary method 500 performed by an electronic device for tagging external content. While the flowchart discloses the following steps in a particular order, it will be appreciated that at least some of the steps can be moved, modified, or deleted where appropriate, consistent with the teachings of the present disclosure.

In this exemplary embodiment, a user can utilize an electronic device (e.g., electronic device 310) that comprises a web browser like, for example, Google™ Chrome™, Mozilla™ Firefox™, Microsoft™ Internet Explorer™, etc. The user can run a web browser to access content external to an internal database system (e.g., database system 100) that is present on a website or otherwise accessible via a network (e.g., network 320), such as the Internet or an intranet. In this disclosure, intranet can mean any network that is understood as a network that does not encompass the Internet including, for example, a local area network, a wide area network, a campus area network, a metropolitan area network, an extranet, a private extranet, any set of two or more coupled electronic devices, or a combination of any of these or other appropriate networks. Also, for the exemplary embodiment of FIG. 5, it is understood that the electronic device is external to an internal database system, as described in relation to FIGS. 1 and 2 earlier, where the database system is a part of an internal network.

In step 505, a bookmarklet is installed in the web browser of the electronic device. A bookmarklet can be a bookmark that is stored in a web browser and can contain JavaScript™ commands to extend the web browser's functionality. That is, a bookmarklet can be a simple "one-click" tool that can add functionality to the web browser. For example, a bookmarklet can modify the appearance of a web page within the web browser by changing the font size or the background color of the text, and/or extract data from a web page.

In some embodiments, a plug-in, instead of a bookmarklet, can be installed. A plug-in can be implemented as a set of software components that adds specific abilities to a larger software application, like a web browser, to enable customizing the functionality of the software application. For example, a plug-in can be installed in a web browser to enable the web browser to play video.

There are some advantages to using a bookmarklet as opposed to a plug-in. For example, a bookmarklet can be web browser-agnostic. That is, the same code underlying a given bookmarklet can be used to run on any of the web browser such as Google™ Chrome™, Mozilla™ Firefox™, Microsoft™ Internet Explorer™, etc. A plug-in, on the other hand, need not be compatible between various web browsers. A user might choose to install a bookmarklet due to its simplicity and browser-agnostic capability.

In some embodiments, a bookmarklet can be installed, for example, by a process similar to adding a bookmark to the web browser. For example, if the user intends to bookmark a particular website, the user can drag an icon associated with the web address (also known as uniform resource locator) of the website to the bookmark bar of the web browser. Similar to the process of adding a bookmark, the user can drag an object or link associated with a bookmarklet to the bookmark bar of the web browser to install the bookmarklet to the web browser. As known in the art, there are several other ways of adding a bookmarklet, for example, using keyboard shortcuts, importing bookmarklets from other web browsers, manually adding by right-clicking the bookmark bar and selecting adding page, etc.

A plug-in can be installed in the web browser instead of, or in addition to, a bookmarklet. A plug-in can be installed similar to any software application like, for example, the web browser. The user can first download the plug-in from an appropriate web site and then can proceed to install the plug-in. Since a typical plug-in is designed to be compatible to a specific web browser (e.g., Google™ Chrome™, Mozilla™ Firefox™, Microsoft™ Internet Explorer™, etc.), the plug-in can become a part of the web browser automatically after the plug-in is installed.

Referring again to FIG. 5, in step 510, the electronic device accesses the external content using the web browser. In this disclosure, "external content" signifies that the accessed content is external to an internal database system (such as Database System 100). The accessed external content can be found on the Internet or can be part of an intranet of an organization. Additionally, external content can be digital content that is accessible via web browsers of electronic devices. In some embodiments, external content can comprise structured or non-structured data including web pages, documents, email messages, text messages, Adobe™ PDF documents, and other media-based content. The other media-based content can comprise external content based on, for example, audio, video, etc. In some embodiments, accessing external content can comprise, for example, opening a web page or a document in the web browser. In some other embodiments, accessing external content can comprise, for example, modifying or editing external content in the web browser.

In step 515, the web browser is enhanced by providing a tagging interface, such as tagging interface 450. Enhancing the web browser can involve rewriting or modifying at least a portion of the underlying code of the web browser, wherein the web browser can display at least some of the accessed external content. The enhancement can be accomplished by running or activating the installed bookmarklet. In some embodiments, when the installed bookmarklet is activated, the underlying code of the web browser specific to the accessed external content can be modified or altered in order to display a tagging interface in the web browser. For example, when a web page on the Internet is the accessed external content (say, a news web page accessed at <http://www.cnn.com>) and is displayed in the web browser, the activation of the installed bookmarklet can enhance the web browser for displaying a tagging interface (such as tagging interface 450) in the web browser.

In some embodiments, enhancing the web browser can also include enhancing the local copy of the external content being accessed in the web browser. For example, if the accessed external content is a news web page associated with CNN™, as noted above, enhancing the web browser can include modifying or editing the specific content associated with the displayed CNN™'s news web page.

Next, in some embodiments, the user can select or highlight at least a portion of the external content for tagging. For example, the user can select a portion of text of a news web page for tagging that portion of the content. The user can select or highlight a portion of the external content (for example, selecting by using a mouse or touchpad) and can select, using the tagging interface, a type of tag to be created for that selected or highlighted portion. The tagging interface can be a graphical user interface that enables a user to create tags for tagging external content. In some embodiments, the tagging interface can enable a user to create tags of different kinds, for example, an object tag (e.g., object tag option 406), a link tag (e.g., link tag option 408), and a property tag (e.g., property tag option 404). The selecting of various tag options can provide different functionalities and fields, as discussed above. After the user selects an appropriate tag option for the selected portion of the external content, the tagging interface provides the ability to create a tag. For example, the tagging interface can include an option called "Create Tag" (Create Tag 414 of FIG. 4).

In step 520, the created tag that is associated with the enhanced web browser is received by the tagging interface. In some embodiments, one or more created tags can be associated with the enhanced portion of the external content. For example, FIG. 4 shows that the text "Curiosity" 402 was selected from the web page displayed in the web browser of FIG. 4. Also, FIG. 4 depicts tagging interface 450 enabling the creation of an object tag associated with the selected text, "Curiosity." After the user selects the text "Curiosity," the user can assign some properties for a tag to-be-created and finishes the process of creating the object tag by selecting the option create tag button 414 of FIG. 4. After the create tag button 414 is selected, a tag associated with the selected text, "Curiosity" is created and received by tagging interface 450.

In step 525, the received tag is stored. The received tag can be stored in an external system (e.g., a memory of the electronic device or a cache associated with web browser), or a combination of both. In step 530, the received tag and the external content can be exported to an internal database system (internal database system 100). In some embodiments, the electronic device must be logged into the internal database system to export the external content and any created tags. In some embodiments, content and created tags can be stored in the electronic device and be later exported after the electronic device connects to the internal database system. In some embodiments, the receipt of a created tag causes an automatic export of the content and created one or more tags to the internal database system. In some embodiments, the receipt of the created tag is stored to the internal database system and export step 530 may not be needed.

According to some embodiments, the operations, techniques, and/or components described herein are implemented by one or more special-purpose computing devices (e.g., electronic device 310). The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
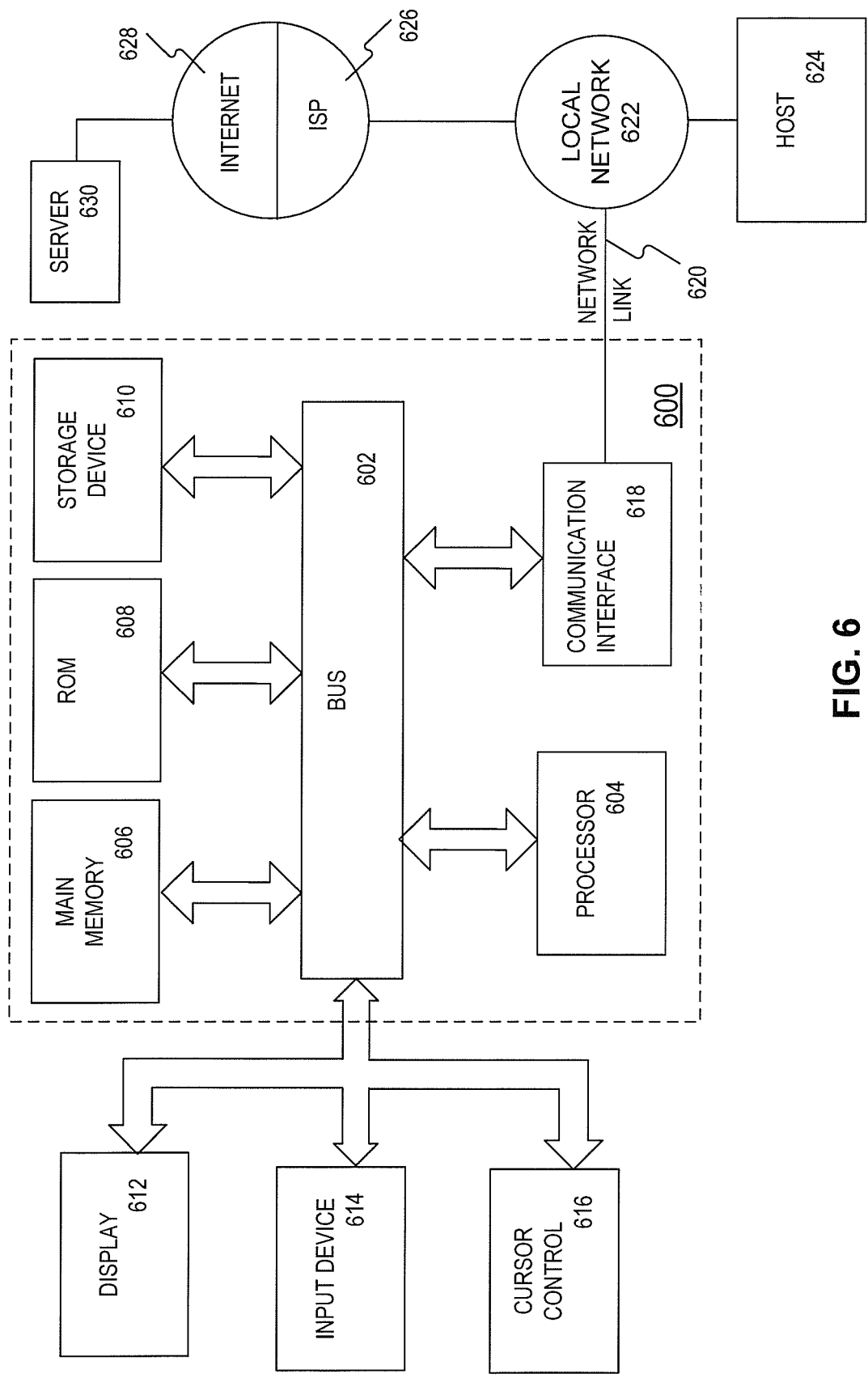
FIG. 6 is block diagram of an exemplary computer system with which embodiments described herein can be implemented, consistent with embodiments of the present disclosure.

By way of example, FIG. 6 is a block diagram that illustrates a computer system 600. Computer system 600 includes a bus 602 or other communication mechanism for communicating information, and one or more hardware processors 604, coupled with bus 602 for processing information. One or more hardware processors 604 can be, for example, one or more general purpose microprocessors.

Computer system 600 also includes a main memory 606, such as a random access memory (RAM) or other dynamic storage device, coupled to bus 602 for storing information and instructions to be executed by processor 604. Main memory 606 also can be used for storing temporary variables or other intermediate information during execution of instructions to be executed by processor 604. Such instructions, when stored in non-transitory storage media accessible to one or more processors 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 can be coupled via bus 602 to a display 612, such as a cathode ray tube (CRT), an LCD display, or a touchscreen, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 600 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Computer system 600 can implement the techniques and other features described herein using customized hard-wired logic, one or more ASICs or FPGAs, firmware and/or program logic which in combination with the computer system causes or programs computer system 600 to be a special-purpose machine. According to some embodiments, the techniques and other features described herein are performed by computer system 600 in response to one or more processors 604 executing one or more sequences of one or more instructions contained in main memory 606. Such instructions can be read into main memory 606 from another storage medium, such as storage device 610. Execution of the sequences of instructions contained in main memory 606 causes processor 604 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media can be involved in carrying one or more sequences of one or more instructions to processor 604 for execution. For example, the instructions can initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 can optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 can be an integrated services digital network (ISDN) card, cable modem, satellite modem, or a modem to provide a data communication connection to a corresponding type of telephone line. As another example, communication interface 618 can be a local area network (LAN) card to provide a data communication connection to a compatible LAN. Wireless links can also be implemented. In any such implementation, communication interface 618 sends and receives electrical, electromagnetic or optical signals that carry digital data streams representing various types of information.

Network link 620 typically provides data communication through one or more networks to other data devices. For example, network link 620 can provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code can be executed by processor 604 as it is received, and/or stored in storage device 610, or other non-volatile storage for later execution.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An apparatus configured to provide a graphical user interface for tagging content external to an internal database system, the apparatus comprising:
   a display device; a memory device configured to store a set of instructions; and at least one processor configured to execute the set of instructions to perform the following operations:
   wherein the at least one processor is further configured to associate a tag with a portion of content presented in the graphical user interface in response to:
   receiving a selection of at least the portion of content presented in the graphical user interface; and
   receiving, via the graphical user interface, a tag-type input corresponding to the selected portion of content;
   electronically present, on the display device, a graphical user interface configured to display at least: content from an external database; and
   a tag-type selection input that enables a user to designate one of a plurality of tag-types for a tag of external content and one or more property types and associated property values for the tag, the external content comprising at least one of: a web page, a document, a PDF, sound or audio, an image or video, a database, an email, or a form; and receive, via the graphical user interface and the tag-type selection input, a tag.

2. The apparatus of claim 1, wherein the at least one processor is further configured to export the selection of the at least a portion of content presented in the web browser and the tag-type.

3. The apparatus of claim 1, wherein the tag-type input defines a property of the selection of the at least a portion of content presented in the web browser.

4. The apparatus of claim 1, wherein the selection of at least a portion of content presented in the web browser comprises text.

5. The apparatus of claim 4, wherein receiving a selection of at least a portion of content presented in the web browser comprises highlighting the text.

6. The apparatus of claim 1, wherein the selection of at least a portion of content presented in the web browser comprises an audio file, image file, or video file.

7. The apparatus of claim 1, wherein the at least one processor is further configured to export a selection input that enables the user to export the tag and selected content to an internal database system.

8. A method for tagging content external to a database system, the method being performed by one or more processors of an electronic device, the method comprising:
   accessing, with the electronic device, the external content;
   receiving, with the electronic device, a selection of at least a portion of the external content, wherein the portion of the external content comprises at least one of: a web page, a document, a PDF, text, sound or audio, an image or video, a database, an email, or a form; displaying, with the electronic device, the tagging interface, wherein the tagging interface comprises at least one graphical user interface that enables a user to create tags; and
   receiving, via the tagging interface, a selection of a tag option that corresponds with the portion of the external content;

tagging, using a tagging interface in the web browser, the selected portion of the external content;

receiving a created tag associated with a tagged portion of the external content, the created tag comprising one or more property types and associated property values; and wherein tagging the selected portion of the external content comprises: receiving a selection of at least the portion of content presented in the graphical user interface; and receiving, via the graphical user interface, a tag-type input corresponding to the selected portion of content.

9. The method of claim 8, wherein tagging the selected portion of the external content portion defines the portion of the external content to be an object or a property.

10. The method of claim 8, wherein the selection of at least a portion of the external content comprises text.

11. The method of claim 10, wherein the selection of at least a portion of the external content comprises highlighting the text.

12. The method of claim 8, wherein the selection of at least a portion of the external content comprises an audio file, image file, or video file.

13. The method of claim 12, wherein the audio file, image file, or video file comprises a crop of an image, audio, or video.

14. The method of claim 8, further comprising exporting the received selection of the at least a portion of content presented in the web browser and the tag-type input to the database system.

15. The method of claim 8, further comprising exporting the received selection of the at least a portion of content to enable the user to export the tag and selected content to the internal database system.

16. The method of claim 8, wherein the tag option defines a relationship between an object and a property.

* * * * *